United States Patent Office

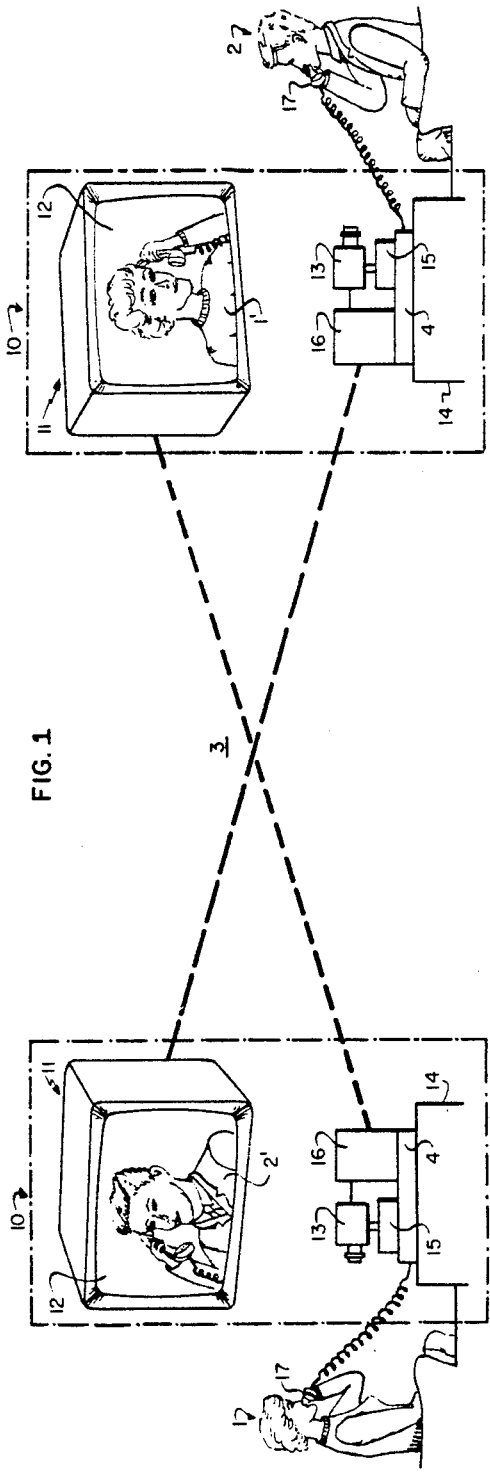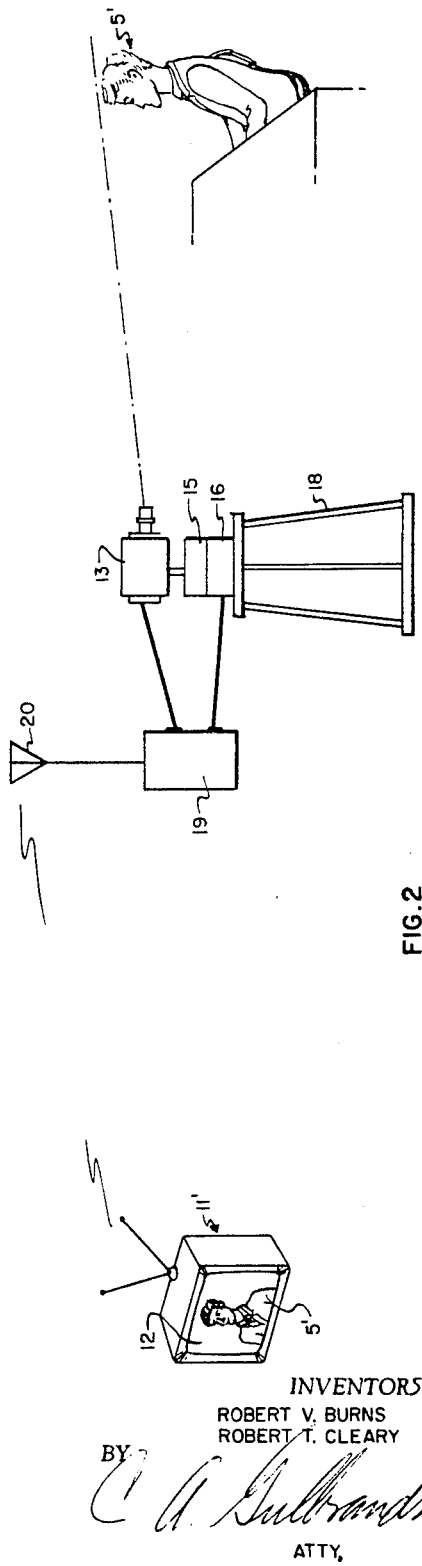
FIG. 1
FIG. 2
INVENTORS
ROBERT V. BURNS
ROBERT T. CLEARY
BY
ATTY.

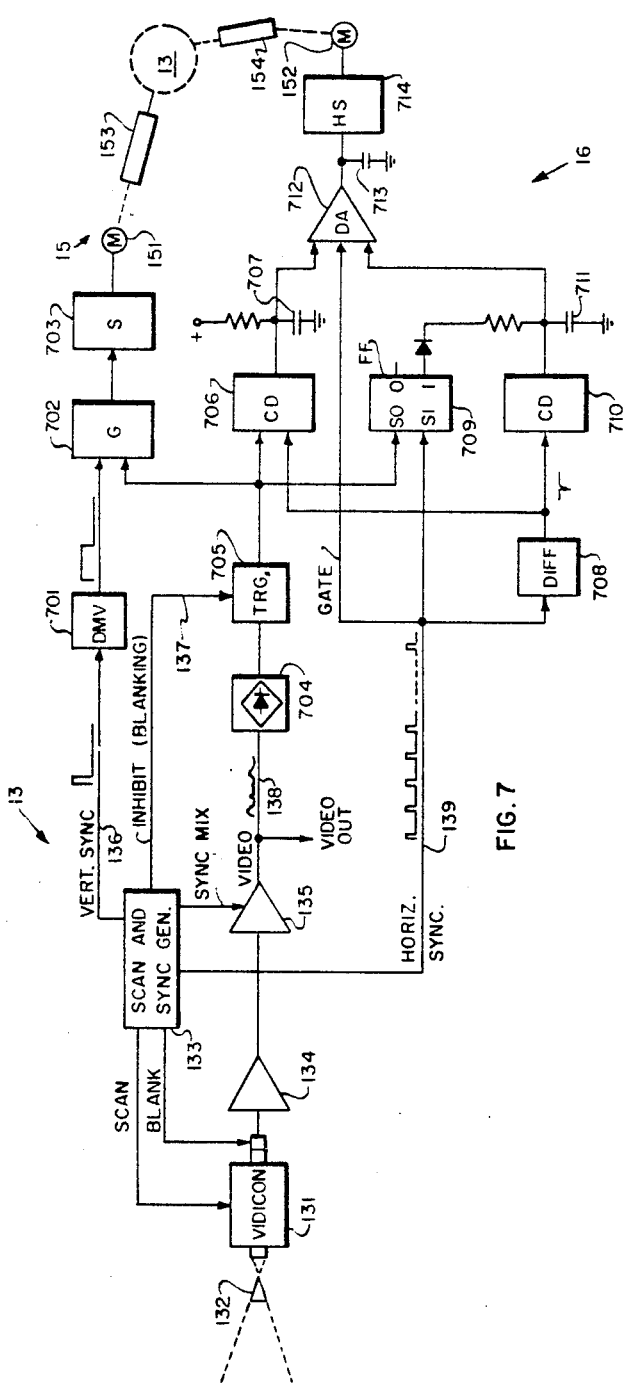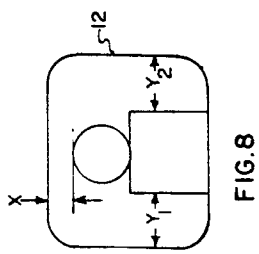
FIG. 8
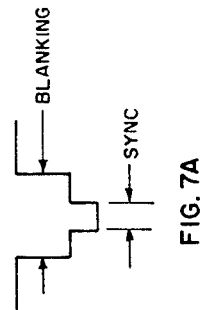
FIG. 7A

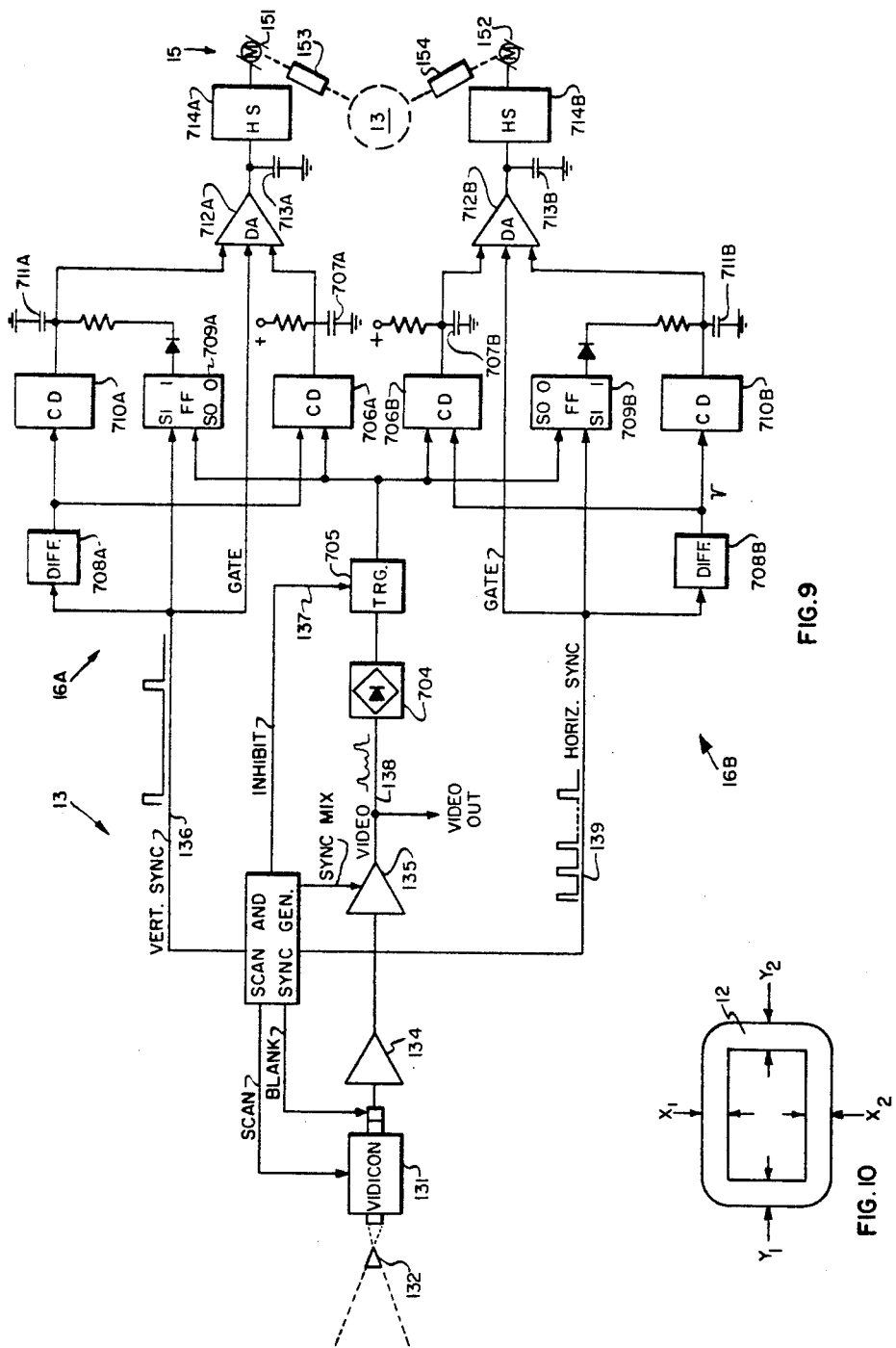

3,419,674
Patented Dec. 31, 1968

3,419,674
IMAGE POSITIONING AND COUPLING CIRCUITS FOR TELEVISION CAMERA AND DISPLAY APPARATUS
Robert V. Burns, Markham, and Robert T. Cleary, Lockport, Ill., assignors to Automatic Electric Laboratories, Inc., Northlake, Ill., a corporation of Delaware
Filed Oct. 14, 1965, Ser. No. 495,840
10 Claims. (Cl. 178—6)

ABSTRACT OF THE DISCLOSURE

The position of a televised image on a CRT is controlled by apparatus which automatically positions the television camera in response to the position of the televised subject in relation to the boundaries of the televised scene. Provision is made to center the image horizontally and/or vertically, to ignore certain portions of a scene (e.g., a desk or chair at the lower portion of a scene) or incidental intrusions into a scene from the sides thereof. Provision is also made to couple video signals to the display in response to a subject being introduced into the viewing area of a camera which is operating, but not as yet transmitting signals to an intended viewer.

---

This invention relates to control apparatus for television systems and more particularly to apparatus for automatically controlling an unmanned television substation in response to the position or changes in position of a subject within the field of vision of a television camera.

Normally a cameraman observes a display monitor, conventionally a cathode ray tube (CRT), to determine if the camera should be raised, lowered, or moved sideways in order to maintain the image of the televised subject in substantially the same proportion of the television display screen of receiving sets. In some systems it is unnecessary or impractical to have a cameraman monitor the image. For a telephone-television system it is not practical to have a cameraman monitor each substation; therefore, it is necessary to provide some means of alignment between the camera and the subject being televised. One type of telephone-television substation employs a self-view feature whereby a subscriber may view his mirror image on his receiving CRT and align himself according to the position of his image. However, during a telephone conversation, it is the usual practice to display the other subscriber's image on the CRT, therefore, placing a restriction on the subscriber to remain in the same position in order to transmit a properly positioned image. Another type of telephone-television substation employs, in addition to its receiving CRT, a monitor CRT which the subscriber may view during the telephone conversation to position himself. However, a subscriber who is continuously aware of his appearance may be somewhat self-conscious or "camera shy," and therefore uncomfortable, much to the detriment of the telephone conversation.

In each of the just-mentioned arrangements, it is necessary for the subscriber to position himself with respect to the television camera. The present invention eliminates the need for a cameraman and eliminates the requirement for the subject being televised to position himself with respect to the camera. It is therefore a primary object of the invention to provide control apparatus for automatically positioning a television camera. In furtherance of this object the present invention provides for a relaxed atmosphere in which a subscriber may feel at ease while he is engaged in telephone-television communication.

A more specific object of the invention is to provide new control apparatus for automatically positioning a television camera in response to the position of a subject being televised.

In the area of marketing, the ability to expand marketing potential has been realized by the use of television-telephone techniques. In such an environment, the problem of positioning of the image of an object, rather than the image of a person, is somewhat different where it would be advantageous to present the image in the center of the screen, as opposed to the way the image of a person is displayed with the lower portion of his body cut off. It is therefore another object of the invention to provide in a visual transmission system new control apparatus for automatically centering a television camera on an object which is being televised.

In telephone-television systems it may sometimes be advantageous for a person to view himself before placing or receiving a telephone call, it is another object of the invention to provide control apparatus for automatically providing a self-view display in response to a person positioning himself in front of a television camera portion of his substation.

A feature of the invention resides in the use of means for moving television camera means or at least the optical-electrical transducer thereof in response to the position of a subject being televised.

Another feature of the invention resides in the utilization of means for timing the interval between a sync pulse and a video indication that the scan has encountered a background to subject transition, means for comparing that interval with a similar interval which begins at a subject to background transition and ends at the next sync pulse, and means for operating a prime mover in accordance with the difference of said intervals to position a television camera.

Another feature of the invention resides in the utilization of means for generating a timed pulse in response to receipt of a sync pulse means for determining if a transition occurs during the interval of the timed pulse, and means for operating a prime mover in a first direction upon occurrence of a transition during the time pulse and in a second direction when a transition does not occur during the time pulse.

Another feature of the invention resides in the use of means for coupling video signals from a television camera to a television monitor in response to the introduction of a subject into the field of view of said television camera.

Another feature of the invention resides in the utilization of automatic self-view apparatus for delaying and stretching a sync pulse, for detecting if a video transition occurs during the delayed stretched pulse, and for coupling the video output of a television camera to a display CRT if the transition does occur during the delayed stretched sync pulse.

Another feature of the invention resides in the use of switching means, advantageously a portion of the hook switch pile-up in a telephone subset, for removing the video display due to the automatic self-view feature from the display means.

Other objects and features of the invention will become apparent and the invention will be best understood from the following description taken in conjunction with the accompanying drawings.

In the drawings:

FIG. 1 is a schematic representation of a telephone-television system according to the teachings of the present invention;

FIG. 2 is a schematic representation of a commercial type television broadcast system according to the teachings of the present invention;

FIG. 7 is a schematic diagram describing apparatus of an embodiment of the invention;

FIG. 7A is a representation of mixed blanking and sync pulses;

FIG. 8 is a view of receiving cathode ray tube according to the apparatus of FIG. 7;

FIG. 9 is a schematic diagram describing apparatus of another embodiment of the invention;

FIG. 10 is a view of a receiving cathode ray tube according to the apparatus of FIG. 9;

Figure 11:
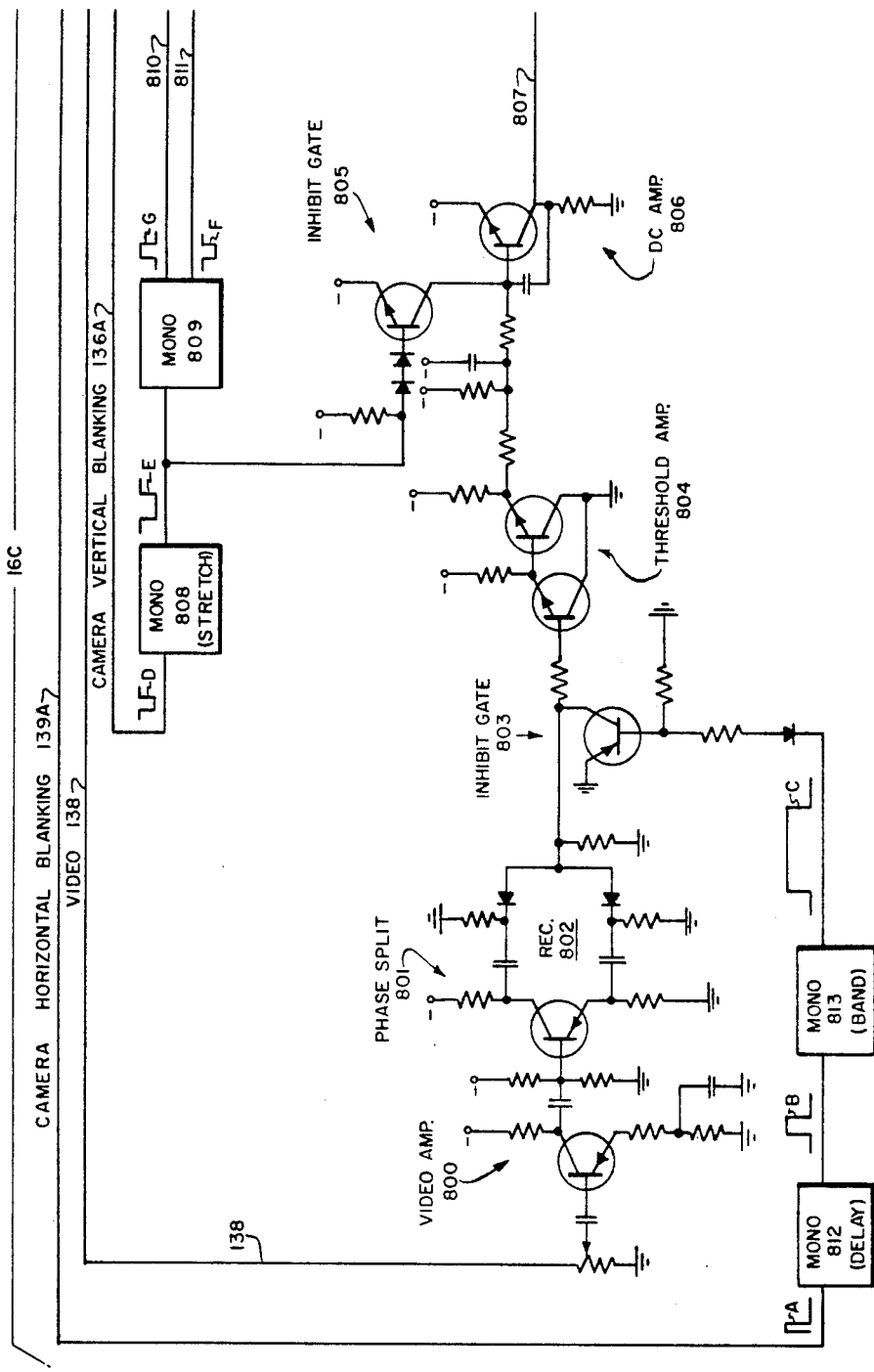
Figure 12:
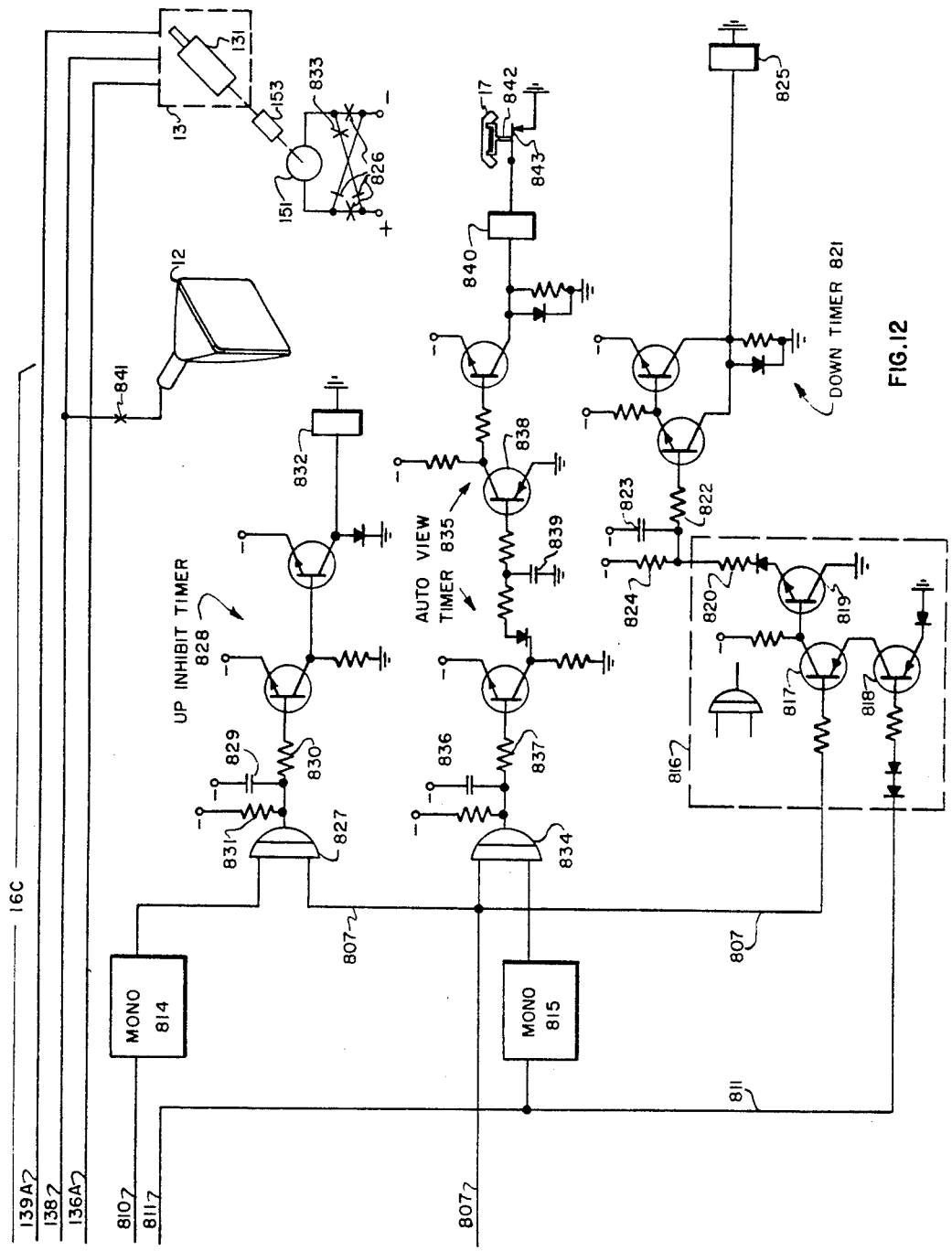
Figure 14:
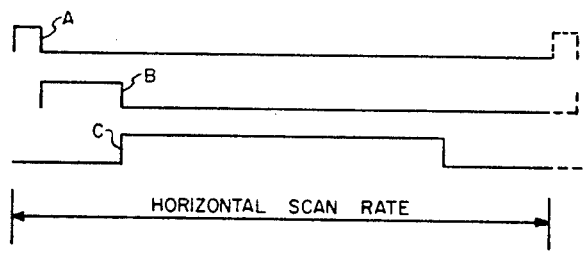
Figure 15:
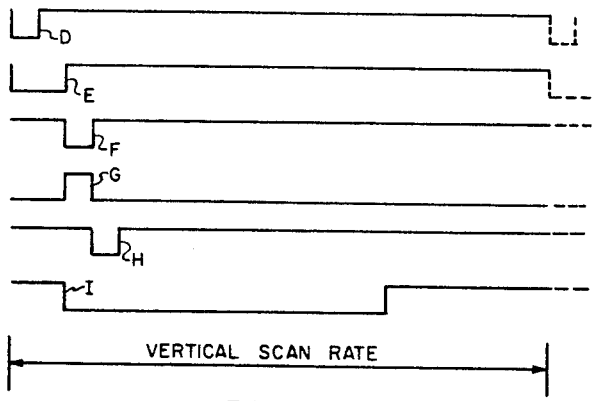
Figure 16:
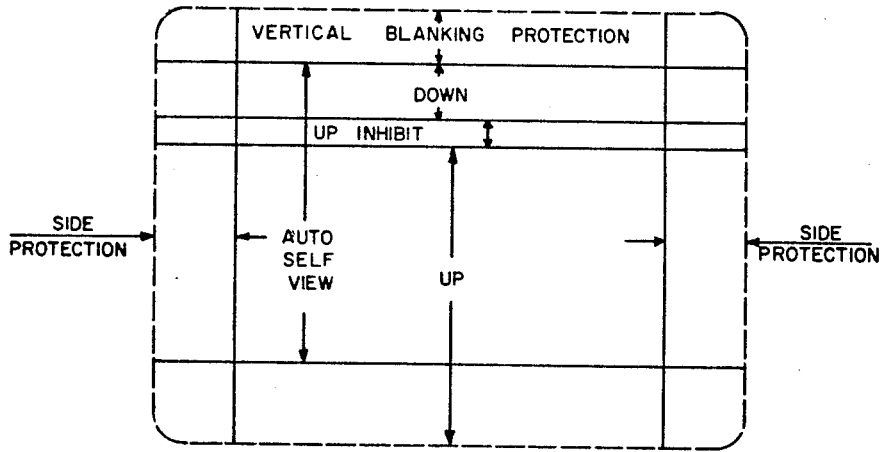

FIGS. 11 and 12 together form a more detailed description of another embodiment of the invention;

FIG. 13 shows proper orientation of FIGS. 11 and 12;

FIGS. 14 and 15 are pulse and timing diagrams as they relate to FIGS. 11 and 12; and FIG. 16 is a functional timing diagram of the face of a CRT as it relates to FIGS. 11–15.

FIG. 1 describes a telephone call in progress between a party 1 and a party 2 over a transmission medium 3 including a telephone-television switching system (not shown). Each of the two parties is using a telephone-television substation 10 including television receiving means 11 having a device 12 which displays images 1', 2', the television camera 13 which is movably mounted on a desk or table 14 by means of prime mover means 15. A position control arrangement 16 is connected to the camera 13 and the prime mover 15. The telephone-television subset also includes a talking circuit 4 including a handset 17, and/or may more advantageously be of the loudspeaking type.

FIG. 2 describes a commercial broadcast television system where a subject 5, for example, a news reporter, commentator or the like, is communicating with the television audience represented by the receiver 11' which is displaying his image 5' on tube 12. The unattended television pickup equipment comprises a stand 18 carrying prime mover 15 which mounts camera 13 movably thereon. Position control circuit 16 is connected to the prime mover and by way of a television transmitter equipment 19 to the television camera 13 and antenna 20 symbolizes transmission to receiver 11. Such a system would also include control console apparatus for switching between programs; however, it has not been shown since it forms no part of the present invention.

FIG. 7 describes an embodiment of the invention wherein a television camera 13 is positioned by prime mover means 15 under the control of apparatus 16. The camera is described on the left of the drawing (and symbolized on the right in phantom) as comprising vidicon assembly 131, lens 132, signal generator 133, preamplifier 134 and amplifier 135 which are assembled and connected in a well known manner. As far as the present invention is concerned, for control, output leads are; vertical sync 136; retrace blanking or inhibit 137; video 138; and horizontal sync 139.

Control apparatus 16 comprises: multivibrator 701; a vertical sense arrangement including gate 702 and sense circuit 703; rectifier 704; trigger circuit 705; capacitor discharge circuits 706 and 710; flip-flop 709, storage capacitors 707 and 711; horizontal sense arrangement including a differential amplifier 712; integrator 713; sense circuit 714; and differentiator 708.

The prime mover 15 comprises: reversible motor 151; reversible motor 152; gear means 153; and gear means 154. The gear means are carried by a stand or chassis and mount the camera means 13, or at least the video pickup portion thereof, and may advantageously mount the motor means.

FIG. 7A describes a mixed blanking and sync wave form. In the description below, some apparatus employs the blanking signal while other apparatus employs the sync signal. Since the blanking signal and the sync signal are in a sense coincident in time, either may be used as a broad reference herein, and both may be referred to as a sync or synchronizing or control signal. It may be more advantageous to use a particular signal in certain instances: those instances will be pointed out below.

FIG. 9 describes a control arrangement for use when the telecast is of an object to be centered such as a painting, sign, merchandise or the like. Shopping by telephone would be enhanced by the use of this arrangement. It may be seen that the control apparatus 16 includes control arrangements 16A and 16B which are very similar. Each, however, is operated by a different type sync signal. As will be seen below, this arrangement provides centering of the image of the television object on the receiving CRT.

FIGS. 11 and 12 describe a control arrangement, noted by the reference character 16C, which may be used for vertical positioning and automatic self-viewing. FIGS. 11 and 12 comprise: a video input conductor 138, video amplifier 800; phase inverter and splitter 801; rectifier 802; inhibit gate 803; threshold amplifier 804; inhibit gate 805; D-C amplifier 806; AND gate 816; down timer 821; and down control relay 825: all connected in somewhat of a tandem fashion. FIGS. 11 and 12 further comprise: horizontal blanking input 139A; monostable multivibrator 812; and monostable multivibrator 813 which is connected to inhibit gate 803. FIGS. 11 and 12 further comprise: vertical blanking input 136A; monostable multivibrator 808; monostable multivibrator 809; monostable multivibrator 814; AND gate 827; up inhibit timer 828; and up inhibit relay 832: all connected in somewhat of a tandem fashion. Further connected from multivibrator 809 are: multivibrator 815; AND gate 834; auto self-view timer 835; and auto view switching means 840. It should be noted that the input video on conductor 138 is coupled to each of the AND gates 816, 827 and 834. It should be further noted that each of the AND gates are connected to receive different forms of the vertical sync (blanking) signal.

*Subject movement problem*

Figure 3:
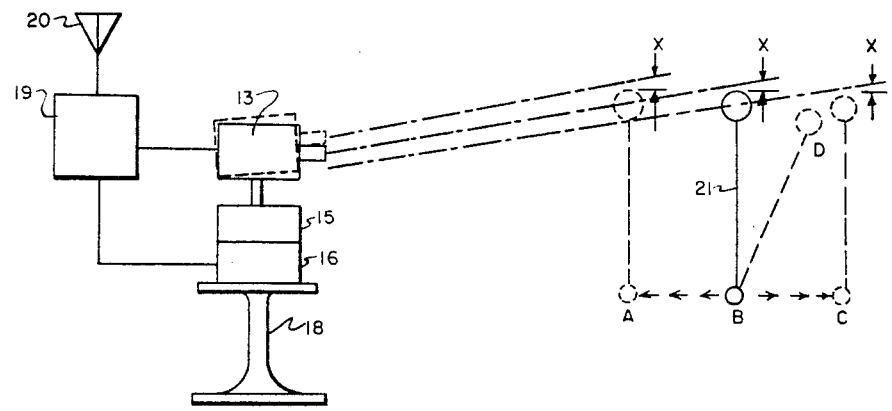
FIGS. 3, 4, 5 and 6 are schematic representations to aid an understanding motion problems of unmanned television camera systems and their correction in accordance with the invention.
Figure 4:
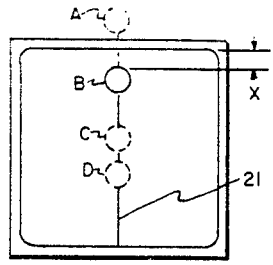

*Vertical plane.*—Referring now to FIGS. 3 and 4, a side view of a scene is given which functionally explains problems encountered in the vertical plane and their solution. The camera 13 is mounted on stand 18 for viewing a subject, illustrated by baton 21. As is the case with most any camera, a certain viewing area is available, the upper limit of which is illustrated by the lines which seem to emit from the camera lens. If a subject 21 of FIG. 3 moves forward from position B to position A, FIG. 4 shows that the top of the image is lost above the top of the CRT unless the camera is moved. Similarly, if subject 21 moves to position C, the bottom portion of the image will be cut off, again as shown in FIG. 4. Further, a backward or forward sway (position D) will cause a loss of the bottom portion of the image. Position B is therefore the optimum position for a fixed camera. By employing the techniques herein, a distance X may be maintained on the display CRT for such movements just described. Therefore, television camera techniques indicated by apparatus 15 and 16 will maintain the position of the image as shown in position B of FIG. 4 by positioning the camera according to the movements of the subject. The problems of movement are the same in commercial television, closed circuit television and telephone-television systems. Therefore, television is used in its broadest sense herein.

Figure 6:
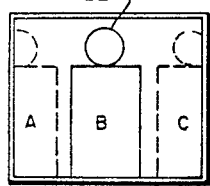
Figure 5:
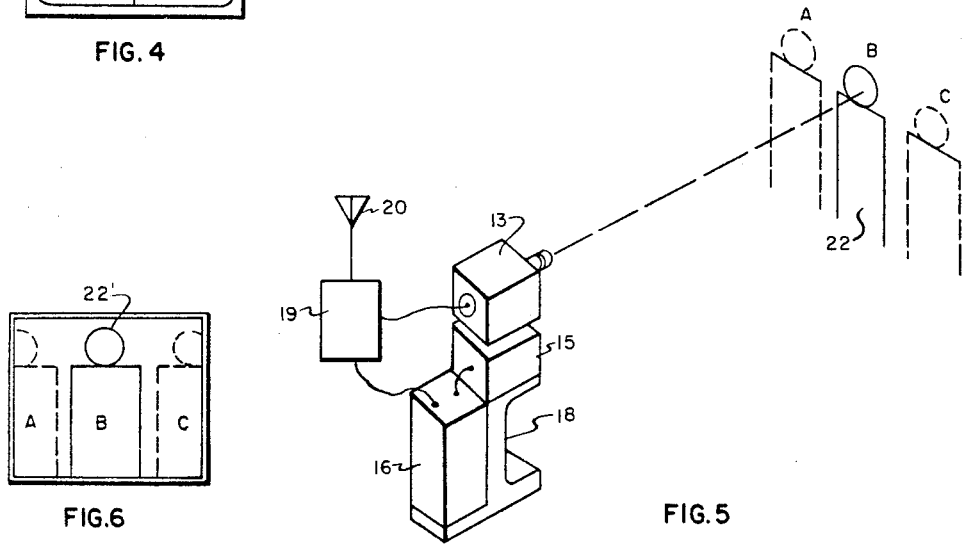

*Horizontal plane.*—Referring to FIGS. 5 and 6 a scene is described which functionally illustrates problems encountered in the horizontal plane and their solution. A camera 13 is mounted on a pedestal 18 for arcuate movement in the horizontal plane. Mounting camera 13 is prime mover apparatus 15. Control apparatus 16 is also carried by the pedestal 18 and is connected to the prime mover 15 and the camera 13 by way of transmitting apparatus 19. Antenna 20 symbolizes transmission to an observer at "the other end" of a transmission medium. If the subject 22 moves from position B to position A, the right hand side of his body will be lost on the viewing screen (FIG. 6). In a similar manner, if the subject moves to position C, his left hand side will be lost (FIG. 6). Therefore, position B is the optimum position the subject can take in a fixed camera system. However, by employing the principles of the present invention, subject 22 may move to the left or to the right and his image will still be maintained at position B on the display CRT.

*Automatic positioning*

Turning now to FIGS. 7 and 8, the automatic camera positioning techniques will be discussed in detail. The distance X in FIG. 8 may be determined, for example, as a percentage of the total height of the CRT. As will be seen later, the distances $Y_1$ and $Y_2$ are variable, and with perfect tracking, tend to be equal. Assume that: the image of FIG. 8 is being televised from camera 13 of FIG. 7; the scan and sync generator is energizing conductors 136, 137 and 139; and the conductor 138 carries video signals accordingly.

Terms employed herein such as "operating the motor down" and "operating or moving the camera down" refer to the movements of the image in relation to the display means. If the prime mover engages the vidicon assembly to the rear of its pivot point, down operation of the prime mover, causing a downward movement of the back of the vidicon assembly, resulting in a downward movement of the image in relation to the CRT.

*Vertical positioning.*—A vertical sync pulse is generated just before a new picture is to be scanned and sets the delay multivibrator 701. The duration of the output pulse of the multivibrator is adjusted according to the distance X so its trailing edge would end at the selected point for the top of the image. The video signal is full-wave rectified by rectifier 704 and operates trigger circuit 705 when the video signal includes magnitudes indicative of a transition from white to black or black to white. A Schmitt trigger provides such threshold and may advantageously be used to gate circuit 702. If a transition occurs during the time duration of an output pulse from the delaying multivibrator 701, gate 702 is operated. Sense circuit 703, which may be for example sensitive only to positive signals, is normally conditioned to drive motor 151 in a first vertical direction, say the direction to lower the camera 13. Upon a true gate (indicating that the image is too high) sense circuit 703 is conditioned to drive the motor in the opposite direction. Gear means 153 couples motor means 151 to camera 13 and translates the rotational movement of the motor into linear motion to raise and lower the camera. An experimental model of the invention employed a pivot mounting so that the camera would be moved up and down in an arcuate path.

*Horizontal positioning.*—Flip-flop 709 is set "1" at the beginning of each horizontal scanning by the horizontal sync pulse. This flip-flop is set "0" by the first transition signal thereafter. Capacitance 711 charges during this interval and the charge is proportonal to $Y_1$, of FIG. 8. It should be noted that capacitance 711 is discharged by the trailing edge of each horizontal sync pulse via differentiator circuit 708 and discharge circuit 710 so that charging starts at zero voltage for each line. Capacitance 707, connected for normal charging is discharged by each transition pulse and discharge circuit 706. The charge of capacitance 707 at the end of a line is proportional to the time from the last transition to the end of that line (the distance $Y_2$, FIG. 8). Differential amplifier 712 is gated by a horizontal sync pulse and the charges on the two capacitors 707, 711 are compared. The output of amplifier 712 is integrated by capacitance 713 and the horizontal sense circuit 714 is operated to energize motor 152 for moving camera 13 accordingly via gear means 154. The horizontal sense circuit 114 comprises a first portion sensitive to positive pulses, such as sense circuit 703, and another portion sensitive only to negative pulses. The capacitance discharge circuits are merely transistors which offer low impedance paths to ground. It should be noted that differentiator 708 is connected to operate discharge circuit 706 so that the charges will be equal at the end of a line where no transitions occur.

*Automatic centering*

Automatic centering is achieved by somewhat the same techniques as the horizontal positioning techniques of FIG. 7 by employing an additional horizontal positioning circuit for the vertical drive in place of vertical positioning elements 701, 702 and 703.

Referring to FIGS. 9 and 10, an article of merchandise or the like can be centered on the CRT 12 of FIG. 10. Dual circuits 16A and 16B, operated by vertical and horizontal sync pulses respectively, in conjunction with the video signal from camera 13, control the movement of camera 13 in the vertical and horizontal planes. The arrangement operates as just described for the horizontal positioning of FIG. 7 to make distance $X_1$ equal to distance $X_2$ and distance $Y_1$ equal to distance $Y_2$.

*Vertical positioning with auto self-view*

*Vertical positioning.*—In the embodiment described in FIGS. 11 to 16, switching means 825 and its contacts 826 operate to determine which direction the motor 151 will rotate. It can be seen that contacts 826 reverse the polarity, and thus the direction of rotation, of motor 151. Therefore, movement in the vertical plane is, in general, controlled by the single switching means 825. Video signals on conductor 138 are amplified by circuit 800 after which their phase is inverted and split at circuit 801 and fully rectified by circuit 802. Those video signals which are definitely of a magnitude to be considered a subject to background or background to subject transition are amplified by threshold amplifier 804 and D-C amplifier 806 and presented as a video transition input to transistor 817 of AND gate 816. The other input to AND gate 816 is derived from a vertical blanking pulse on conductor 136A as follows: monostable multivibrator 808 stretches the vertical blanking pulse and sets multivibrator 809 to its unstable state which provides outputs comprising pulse F as the other input to AND gate 16 via conductor 811 connected to transistor 818. If AND gate 816 becomes true, that is if a video transition and pulse F occur at the same time, capacitor 823 of down timer 821 will be charged via a small value of resistance 820 and the down timer will operate relay 825 to move the image down. Since the video transition and the pulse F are of short duration, capacitor 823 acts to hold relay 825 operated for a predetermined time as it discharges through a much higher resistance path including resistance 822. AND gate 816 will become true each time a transition occurs during the pulse F. It can be seen that with this circuit alone, the image will be moved up by a false gate 816 and down by a true gate 816 which can lead to a jerky operation at the borderline of the selected distance X from the top of the CRT 12. An up inhibit timer has been provided to mark off a small no man's land between the up and down sensing (FIG. 16).

*Up inhibit timer.*—Gate 827 has the same circuitry as gate 816, therefore, the up inhibit timer 828 operates substantially the same as the timer 821 with respect to charging and discharging capacitor 829. However, it can be seen due to the output circuitry of the up inhibit timer, relay 832 is normally operated and via contacts 833 normally provides the up and down control to relay 825. A transition in this no man's land will not be sensed down and up operation is inhibited. The no man's land comes from gate 827 being true to release relay 832 for a timed interval. Gate 827 is true upon the coincidence of a transition via conductor 807 and pulse output H of the multivibrator circuit 814. Referring to FIGS. 15 and 16, it can be seen that the vertical blanking protection zone corresponds in time to pulses D and E, the vertical blanking and stretched vertical blanking pulses. Next in time is pulse F (and pulse G) which, as previously noted, is the down sensing time. Following pulse F is pulse H which can be seen to correspond to the up inhibit time in FIG. 16. The following "up time" of FIG. 16 relates to the vertical position of a subject, which will be sensed as requiring an up condition of contacts 826 of relay 825.

*Side protection.*—It is possible that a subject may enter the field of viewing of the vidicon assembly by accident for a short period of time, not intending that the camera track his vertical movements. To provide side protection for such events a horizontal control signal (particularly the horizontal blanking pulse) on conductor 139A is delayed by monostable multivibrator 812 to provide via circuit 813 a central band in the field of the vision of the vidicon assembly into which the subject must enter in order to get a response at relay 825. Referring to FIG. 14 it may be seen that the horizontal blanking pulse is delayed as indicated by pulse B to provide pulse C which is a portion, say 60%, of the field of vision and a like portion of the face of a monitor CRT. Therefore, any such accidental intrusion into the left or right 20% of the field of vision of vidicon assembly will not provide valid transition signals to operate relay 825.

*Vertical blanking protection.*—Vertical blanking protection against noise of retrace or the like is provided by the delayed blanking pulse being employed to inhibit passage of a transition signal through the D-C amplifier 806 by closing this path at inhibit gate 805. As previously mentioned, this is essentially vertical synchronizing pulse and accordingly appears as the top portion of FIG. 16.

*Auto self view.*—The auto self view feature of the invention is particularly useful in telephone applications wherein a subscriber may wish to do some last-minute primping before placing or answering a call. In either case, termination of self viewing is advantageously accomplished by merely going to an off-hook condition. In the conventional type of telephone, this is done by removing the handset from the cradle: in the loudspeaking telephone, it is done by operating the loudspeaking switch hook. It should be noted that in a telephone application, one will most probably have some type of chair arranged in front of the television camera portion of his subset so that care must be taken that the top edge of the chair which is more or less permanently located in the lower portion of the viewing area, will not be confused with the top of the subscriber's head and be sensed for vertical positioning. A video transition for someone who has just entered the viewing field of the vidicon assembly is, as previously described, transmitted on conductor 807 where it is connected to AND gate 816, 827 and 834. Gate 834 is similar to gate 816 providing a fast charging path for capacitor 836 as was done in the previous timing circuits. The other input to gate 834, pulse I, is derived from the vertical blanking pulse on conductor 136A as follows: the vertical blanking protection pulse E: (stretched pulse E) sets monostable circuit 809 to its unstable state providing output pulses F and G; and pulse F via conductor 811 sets monostable circuit 815 to provide pulse I as the second input to gate 934. The monostable circuit 815 is adjusted to provide the trailing edge of pulse I before the vertical scan reaches the top of a chair positioned in front of the vidicon assembly, as previously mentioned. AND gate 834 being true charges capacitor 836 quite rapidly, the discharge of which is again relatively slow through a circuit including resistance 837 of the auto view timer 835. Auto view timer 835 has an additional capacitor 839 which charges upon a true gate to maintain transistor 838 conductive slightly longer than it would normally be, so that an image will appear on CRT 12 as a steady picture and the auto view circuit will not repeatedly switch on and off the viewing of an image as would happen if someone would thrust their arm in and out of the auto view sensing portion of the field of vision. Operation of the auto self view timer operates relay 840 and closes its contacts 841 to provide the video signal on conductor 138 to reach the monitor CRT 12. Hookswitch contacts 843 are interposed in the powering circuit of relay 840 to indicate that a subscriber may terminate self viewing before placing or receiving a telephone call by removing handset 17 from cradle 842 to open contacts 843.

Normally a vidicon assembly would most advantageously be positioned to point down, the extreme upper and lower positions being determined by limit switches (not shown) as required. Any subject walking into the field of vision, either due to initial powering of the camera with a subject already in front thereof, or due to a "walk on" for auto self-view, will cause the vidicon assembly to be automatically positioned in accordance with the position of the subject.

*Summary*

Several embodiments of the invention have been described by specific nonlimiting illustrations. Many changes may be made in any of the embodiments of the invention by one skilled in the art. For example, one may make the vertical positioning control operative during the auto self-view time or the auto self-view feature may be used alone and the subscriber may adjust his position accordingly until he goes off hook. Also, automatic centering has been described as a combination of dual horizontal positioning circuits; however, by way of contrast automatic positioning may be had by use of dual vertical position circuits constructed and arranged so that the top of the image is down a distance X from the top of the display CRT and the side of an image, say the right hand side, is over a distance Y from the corresponding edge of the display CRT.

Subject, as employed herein, pertained to persons in the illustrations; however, subject or object can mean anything which is the center of concern in a telecast whether it be animate or inanimate. For example, one may wish to telecast the image of an animal. The image of such a subject would more than likely be best shown when centered on the receiving display means.

Many other changes and modifications may be made in the invention by one skilled in the art, without departing from the true spirit and scope of the invention and should be included in the appended claims.

What is claimed is:

1. Apparatus for automatically positioning movably mounted television camera means in response to movements of subject being televised, said camera means providing vertical and horizontal control pulses for indicating the beginnings of vertical and horizontal scanning of the field being televised and video signals including signals indicating transitions between said subject in said field and its background, said camera positioning apparatus comprising: means operated by a vertical control pulse to provide a timed output; motor means operable to move said camera means in vertical and horizontal planes; vertical sensing means coupled to and controlling said motor means, said vertical sensing means enabled by said transition pulse and said timed output to operate said motor means in one vertical direction and by said timed output to operate said motor means in the opposite vertical direction; horizontal control means operated by transition pulses and horizontal control pulses to provide an output corresponding to the difference between the time interval between a horizontal control pulse and a transition pulse and the time interval between the following transition pulse and the next horizontal control pulse; and horizontal sensing means coupled to and controlling said motor means, said horizontal sensing means enabled to operate said motor means in one horizontal direction when the first-mentioned interval is the greater and in the opposite horizontal direction when the second-mentioned interval is the greater.

2. Apparatus for positioning movably mounted television camera means with respect to a subject being televised, said camera means providing vertical and horizontal control signals corresponding to the beginnings of vertical and horizontal scannings of the field to be televised and video signals including signals indicating transition between said subject and its background, said positioning apparatus comprising: motor means operable to move said camera means in vertical and horizontal planes; means coupled to said motor means and operated by said vertical control signals and said transition signals to automatically control vertical operation of said motor means; and means coupled to said motor means and operated by said horizontal control signals and said transition signals to automatically control horizontal operation of said motor means, said horizontal and vertical control means each comprising first means operated by a first of its respective control signals and a first transition signal to time the interval therebetween and operated by the next transition signal and the next of its respective control signals to time the interval therebetween, and means to compare said intervals and operate said motor means in a direction to make said intervals equal.

3. Apparatus for positioning movably mounted television camera means with respect to a subject being televised, said camera means providing vertical and horizontal control signals corresponding to vertical and horizontal scannings of the scene being televised and video signals including signals indicating transition between said subject and its background, said apparatus comprising: motor means coupled to said camera means; control means coupled to said camera means and to said motor means, said control means operated by said vertical control signals and said transition signals to control the operation of said motor means for positioning said camera means, said control means comprising a video path including means for providing a transition pulse in response to a transition signal, a control path including means for providing a delayed control output in response to a vertical control signal, means connected to said video and control paths and operated in response to said transition pulse and said delayed control output to control the operation of said motor means, means connected to said two paths and including means for providing a second delay of said vertical control signals in response to the operation of said delayed control output means, and means operated by a twice-delayed vertical control signal and a transition pulse to inhibit operation of said motor means for a predetermined time interval.

4. Apparatus according to claim 3, wherein said control means comprises a horizontal control path including means operated by a horizontal control signal to provide a delayed horizontal control pulse, and means connected to said video path and operated in response to said delayed horizontal control pulse to permit transmission through said video path for a predetermined portion of the horizontal scan.

5. Apparatus according to claim 3, comprising: image display means; means in said vertical control signal path and operated to provide a stretched vertical control signal in response to receipt of a vertical control signal; and means connected to said vertical control path and to said video path and operated by a transition signal in conjunction with said stretched control signal to couple video signals from said camera means to said display means.

6. Apparatus according to claim 5, wherein said means for providing said stretched vertical control signal is operable for a predetermined portion of a vertical scan whereby signal coupling will not occur upon transitions due to objects which are normally in the lower portion of the televised scene.

7. In a telephone substation including television camera means conditioned to provide control signals and video signals and normally inoperative image display means, apparatus for automatically connecting said video signals to said image display means in response to a subscriber positioning himself within the view of said camera means in order to participate in a telephone call, said apparatus comprising: a video transmission path between said camera means and said display means; and switching means including normally open contacts interposed in said transmission path, said switching means connected to said camera means, and further including means for providing an output pulse in response to a control signal, means for closing said contacts in response to the coincidence of said output pulse and a video signal indicative of a subscriber-background transition and timing means for maintaining said contacts closed between control pulses.

8. Apparatus in a telephone substation as claimed in claim 7, wherein said switch means has a powering path for said contact closing means, and comprising hookswitch means including contacts interposed in said powering path and operated to inhibit operation of said switch means when said substation is in an off-hook condition.

9. Apparatus for positioning a movably mounted television camera with respect to a subject being televised, said camera providing vertical and horizontal control signals corresponding to the beginnings of vertical and horizontal scannings of the field to be televised and video signals indicating transitions between said subject and its background, said apparatus comprising: motor means operable to move said camera in vertical and horizontal planes; means coupled to said motor means and operated by said vertical control signals and said transition signals to automatically control vertical operation of said motor means, said vertical control means comprising means operated by a vertical control signal to provide a timed output pulse, means operated by a transition signal to provide a transition pulse, vertical sensing means coupled to said motor means and normally conditioned to operate said motor means in a first direction, and means connecting said two pulse providing means to said sensing means and operated in response to the occurrence of a transition pulse during the time of said output pulse to condition said sensing means to operate said motor means in the opposite vertical direction; and means coupled to said motor means and operated by said horizontal control signals and said transition signals to automatically control horizontal operation of said motor means.

10. Apparatus for positioning a movably mounted television camera with respect to a subject being televised, said camera providing vertical and horizontal control signals corresponding to the beginnings of vertical and horizontal scannings of the field to be televised and video signals indicating transitions between said subject and its background, said apparatus comprising: motor means operable to move said camera in vertical and horizontal planes; means coupled to said motor means and operated by said vertical control signals and said transition signals to automatically control vertical operation of said motor means, means coupled to said motor means and operated by said horizontal control signals and said transition signals to automatically control horizontal operation of said motor means, said horizontal control means comprising first means operated by a horizontal control signal to begin storing energy and by a transition signal to stop storing energy, first discharge means operated by a horizontal control signal to discharge the energy stored in said first energy storage means, second means normally conditioned to store energy and operated by a transition signal to discharge said energy, and horizontal sensing means including differential amplifier means gated by a horizontal control signal to compare the energy stored in said two storage means.

References Cited

UNITED STATES PATENTS

| 2,532,063 | 11/1950 | Herbst | 250—203 X |
| 2,774,964 | 12/1956 | Baker et al. | 343—7.3 |
| 2,977,850 | 4/1961 | Vanstrum | 88—82 |
| 3,043,907 | 7/1962 | Martin | 178—6.8 |
| 3,257,505 | 6/1966 | Van Wechel | 178—6.8 |
| 3,263,027 | 7/1966 | Beltrami | 178—6.8 |

ROBERT L. GRIFFIN, *Primary Examiner.*

R. K. ECKERT, JR., *Assistant Examiner.*

U.S. Cl. X.R.

178—6.8; 250—203